Patented July 1, 1941

2,247,422

UNITED STATES PATENT OFFICE 2,247,422

RESINOUS CONDENSATION PRODUCTS AND THE PRODUCTION THEREOF

Harold James Tattersall, Ardrossan, Scotland, assignor to Imperial Chemical Industries Limited, a corporation of Great Britain No Drawing. Application June 1, 1938, Serial No. 211,295. In Great Britain January 22, 1937

1 Claim. (Cl. 260—70)

This invention relates to new and improved resinous condensation products.

In the production of resins of the urea-formaldehyde type reaction is usually brought about in the presence of an aqueous medium at temperatures below the boiling point of water, e. g. about 80° C., and methylol urea or dimethylol urea is formed in aqueous solution. As substitutes for urea in processes of the kind described there have been used compounds such as cyanamide, dicyanamide, guanidine and thiourea. It has been proposed to condensate formaldehyde in the form of its commercial solution with urea or certain derivatives thereof, e. g. acetyl urea or benzoyl urea, in the absence of condensation-promoting compounds and at temperatures sufficiently high to distill off the aqueous liquor. The products obtained in such processes were described as having a gluey nature and as capable of being hardened by further heating to a temperature, for example, of 80° C.

I have now discovered that, by the employment of certain substituted derivatives of urea, thiourea, or of biuret there may be obtained resinous condensation products of the heat hardenable type which in the alpha stage are characterised by good solubility in organic solvents and by compatibility with nitrocellulose and other cellulose derivatives, and which in the beta stage are still fusible and soluble in certain organic solvents although capable of being converted by further heating into infusible gamma stage products.

According to the present invention a condensation reaction is effected at a temperature above the boiling point of water between formaldehyde, by which is meant a polymer or derivative thereof of the kind customarily employed in the preparation of phenol-methylene resins, and a derivative of a dicarboxylic acid in which one —COOH group has been esterified and the other has been converted into a substituted amide group such for example as —CO.NHX in which X is
—CO.NH$_2$, —CS.NH$_2$, —C(NH)NH$_2$,
—NH.CO.NH$_2$, —NH.CS.NH$_2$, —CO.NH.CO.NH$_2$ or —CS.NH.CS.NH$_2$. The esterifying group may be alkyl, alkenyl, aralkyl or aryl or substituted derivatives thereof free from any group of acidic or basic nature or capable of reacting with formaldehyde.

Suitable compounds for use in the process of the present invention are for example the ureides of the half esters of monohydric alcohols or phenols, e. g. methyl, ethyl, $n$-butyl, iso-butyl, cetyl, oleyl, stearyl, alkyl, or formyl alcohol, with dicarboxylic acids, e. g. adipic, succinic, maleic, phthalic acid, or glycol dihydrogen phthalate. These ureides may be obtained by heating urea with the appropriate half ester at a temperature of about 110° C. upwards under such conditions that the water is distilled off.

In place of these ureides there may be also be used the corresponding derivatives of thiourea, biuret, thio-biuret, guanidine, semicarbazide or thio-semicarbazide, these derivatives being obtainable by reaction with a suitable half ester in a manner similar to that described for the ureides.

In putting the invention into effect it is preferred to use a solid form of formaldehyde such as paraformaldehyde or trioxymethylene.

The reaction leading to the production of the resinous materials according to my invention is attended by the elimination of the elements of water and it occurs readily at temperatures from about 110° upwards. In its initial stages excessive frothing may occur if the temperature is allowed to become too high. The heating is continued until the frothing has subsided and the reaction has proceeded far enough to yield a fused resin of the required properties.

The ureides and like derivatives of the half esters of such acids as phthalic acid are solids of high melting point, and solvents may advantageously be employed to facilitate their admixture with the formaldehyde at the reaction temperature.

As is well understood in connection with manufacture of resins of the hardenable type passing through $\alpha$ and $\beta$ stages, the time of heating required is dependent on the temperature employed, and if $\alpha$ stage resins are required, care should be taken neither to heat to excessive temperatures nor unduly to prolong the period of heating after the frothing has subsided.

Even when $\beta$ stage resins are required it is inadvisable to allow the temperature to exceed 200° C. for any appreciable period otherwise further change into the $\gamma$ stage product may take place prematurely, and for the production of $\alpha$ stage resins temperatures of 110° to 140° C. are convenient.

It is unnecessary to isolate the ureide of the half ester, thus there may be used a previously heated mixture of urea, with a half ester of a dibasic acid from which the water of reaction has been expelled. It is generally convenient, however, to employ the ureide of the half ester in the form of a previously heated reaction mixture containing it which has been produced from a dibasic acid, urea, and a considerable excess of the alcohol by heating these materials until the acid value of the mixture has undergone a very considerable reduction. In general similar remarks apply in the case of the derivatives, for example of guanidine or biuret. When however the ureide has thus been produced without having been isolated, it is preferable that the reaction between it and the formaldehyde should be carried out in the presence of an anticatalyst for urea formaldehyde condensation, such, for instance as sulphur, phenol, resorcinol, bromine, or iodine. Similarly for derivatives of thiourea, guanidine and semicarbazide. In the case of the reaction mixtures containing biuret derivatives however, the anticatalyst should be omitted.

The incomplete conversion of the urea into the mono-ureide of the half ester of the dibasic acid is detrimental to the formation, in the course of the subsequent reaction with formaldehyde, of soluble resins compatible with nitrocellulose and the presence of the anticatalyst serves to ensure that soluble α stage resins are obtained.

In order to obtain successful results in either case starting from a mixture of monohydric alcohol, dibasic acid and urea or the like, it is necessary to employ a considerable excess of the monohydric alcohol over the theoretical, e. g. 4 or 5 molecular proportions for each molecular proportion of urea and of dibasic acid. This excess of the alcohol performs a useful function in acting as a solvent for the derivative of the half ester. The anticatalyst may be introduced into the reaction mixture at this stage if desired. The reaction mixture is heated to a temperature not below 110 to 120° C. until the acid value of the mixture, which diminishes rapidly, has fallen to a stage at which further change in its value tends to become slow. In the case of highly volatile alcohols such as ethyl alcohol and propyl alcohol it is necessary to employ increased pressure. The mixture is advantageously cooled somewhat before introducing the formaldehyde, and is then reheated cautiously therewith. If desired a stoichiometric excess of formaldehyde amounting to 25% over the theoretical may be employed. It is unnecessary in the case of the reaction mixtures prepared from very low boiling alcohols to employ increased pressure during the reheating stage since the gradual removal of the alcohol by distillation allows the temperature to increase sufficiently. If β stage resins are required it is often possible to effect the removal of the excess of the alcohols used during the conversion of the α stage into the β stage products, depending upon their volatility, without the use of reduced pressure, but in some cases it is necessary to carry out the removal of the alcohol at reduced pressures in order to avoid overheating.

Using 4 molecules of amyl alcohol and 1 molecule each of urea and phthalic anhydride for instance, it is found that about 4 hours or more heating at 120° to 130° in the presence of $\frac{1}{10}$ of the weight of urea of sulphur gives a mixture which will react satisfactorily with formaldehyde. The heated mixture may be cooled to a temperature of about 100° before introducing the formaldehyde. The mixture may then be reheated for a period not exceeding ½ to 1½ hours, at 130 to 140° C. in order to obtain an α stage resin. After 1½ hours heating at this temperature the solubility of the resin commences to diminish somewhat and from that period onwards at this temperature the resin commences to acquire the characteristics of the β stage resin.

In carrying out the reaction between the derivative of the half ester and the formaldehyde it is unnecessary to attempt to isolate the monomethylol derivative formed at an intermediate stage in the reaction, but the invention includes within its scope the conversion of such monomethylol derivative into α stage and β stage resins by heating at temperatures above about 110°.

The products of the present invention may be of resinous, powdery or waxy appearance depending upon the particular materials employed.

The α stage resins are soluble in a large number of organic solvents, e. g. benzene, alcohol, acetone and ethyl acetate and are compatible with a variety of cellulose derivatives. They may be used in the manufacture of lacquers, enamels, plastic and coating compositions of various types and are capable of being hardened after their application by baking. Their compatibility in cellulose derivatives renders them useful ingredients of nitrocellulose, benzyl cellulose, cellulose acetate and cellulose ether compositions.

The β stage resins although soluble in certain organic solvents, are principally adapted for moulding purposes for which their thermohardening properties render them of value.

The invention is further illustrated by the following examples.

Example 1

A mixture of 263 parts fermentation amyl alcohol, 74 parts phthalic anhydride, 30 parts urea and 2.4 parts sulphur are heated in a vessel fitted with a reflux condenser, jacket and mechanical stirring gear at 120 to 130° C. until the acid value of the solution determined as phthalic acid has fallen into approximately 17 mgms. per c.c., which will be attained after about 4 hours. The mixture is then cooled to a temperature between 100 and 110° C. and 18.5 parts paraformaldehyde are then added. The mass is then stirred and the temperature is cautiously raised to 130 to 140° C. at which it is retained for 1 hour. During this period part of the amyl alcohol is allowed to distil over. Heating is then stopped and the pressure is reduced to remove the remaining excess of amyl alcohol; the resin may be dissolved up in solvents before it has become solid.

The product is an α stage product soluble in a number of organic solvents and compatible with nitrocellulose.

Example 2

The quantities are as in Example 1, and the preparation is carried out in the same way up to and including the stage in which the paraformaldehyde is introduced into the reaction mixture.

The period of heating with the paraformaldehyde however is 8 hours at 130° to 140° C. instead of 1 hour. The product is a β stage resin and is suitable for moulding purposes.

Example 3

The preparation is carried out as in Example 1, except for the substitution of 34 parts thio-urea for 30 parts urea.

Example 4

The preparation is carried out as described in Example 1, except that the sulphur is omitted and instead of 30 parts urea, there are employed 51.5 parts biuret. The biuret should be free from any sulphur associated with its preparation, and may be rendered so by recrystallisation from water if necessary.

Example 5

The preparation is carried out as described in Example 1, with the substitution of 215 parts normal butyl alcohol for the 263 parts fermentation amyl alcohol.

Example 6

A mixture of 130 parts ethyl alcohol, 74 parts phthalic anhydride, 30 parts urea and 2.4 parts sulphur are heated for 7 hours in an autoclave at 120 to 130° C. The reaction mixture is cooled and after pressure has been released the contents are heated in a vessel arranged for distillation of the alcohol until the temperature has been for at least an hour at 120° C. The product is an α stage resin.

Example 7

The preparation is carried out as described in Example 1, with the substitution of 59 parts guanidine carbonate for the 30 parts urea. The resin is generally similar in its properties to that obtained in Example 1.

Example 8

The preparation is carried out as described in Example 1, with the substitution of 55 parts semi-carbazide hydrochloride for the 30 parts urea. The resin obtained has properties generally similar to that obtained according to Example 1.

Example 9

The preparation is carried out as described in Example 1, with the substitution of 179 parts glycol dihydrogen phthalate for the 74 parts phthalic anhydride. The solubility of the resin in acetone is somewhat higher than that obtained in Example 1.

As many apparently widely different embodiments of this invention may be made without departing from the spirit and scope thereof, it is to be understood that the invention is not limited to the specific embodiments thereof, except as defined in the appended claim.

I claim:

A method for preparing synthetic resins which comprises reacting with heat treatment formaldehyde and the reaction mixture obtained by heating dicarboxylic acid and a urea in substantially equimolecular proportions with monohydric alcohol in amount of not less than about 4 molecular proportions of the alcohol for each molecular proportion of the urea and dicarboxylic acid, said monohydric alcohol being one in which its esterifying group is a substituent selected from the class consisting of alkyl, alkenyl, aralkyl, aryl and substituted derivatives thereof unreactive with formaldehyde and free from groups of acidic or basic nature.

HAROLD J. TATTERSALL.